Nov. 29, 1938.  S. L. ADELSON  2,138,266
FLOW METERING DEVICE
Filed April 23, 1936   2 Sheets-Sheet 1

Inventor:
Samuel L. Adelson,
By Cromwell, Greist & Warden
attys

Nov. 29, 1938.  S. L. ADELSON  2,138,266
FLOW METERING DEVICE
Filed April 23, 1936  2 Sheets-Sheet 2
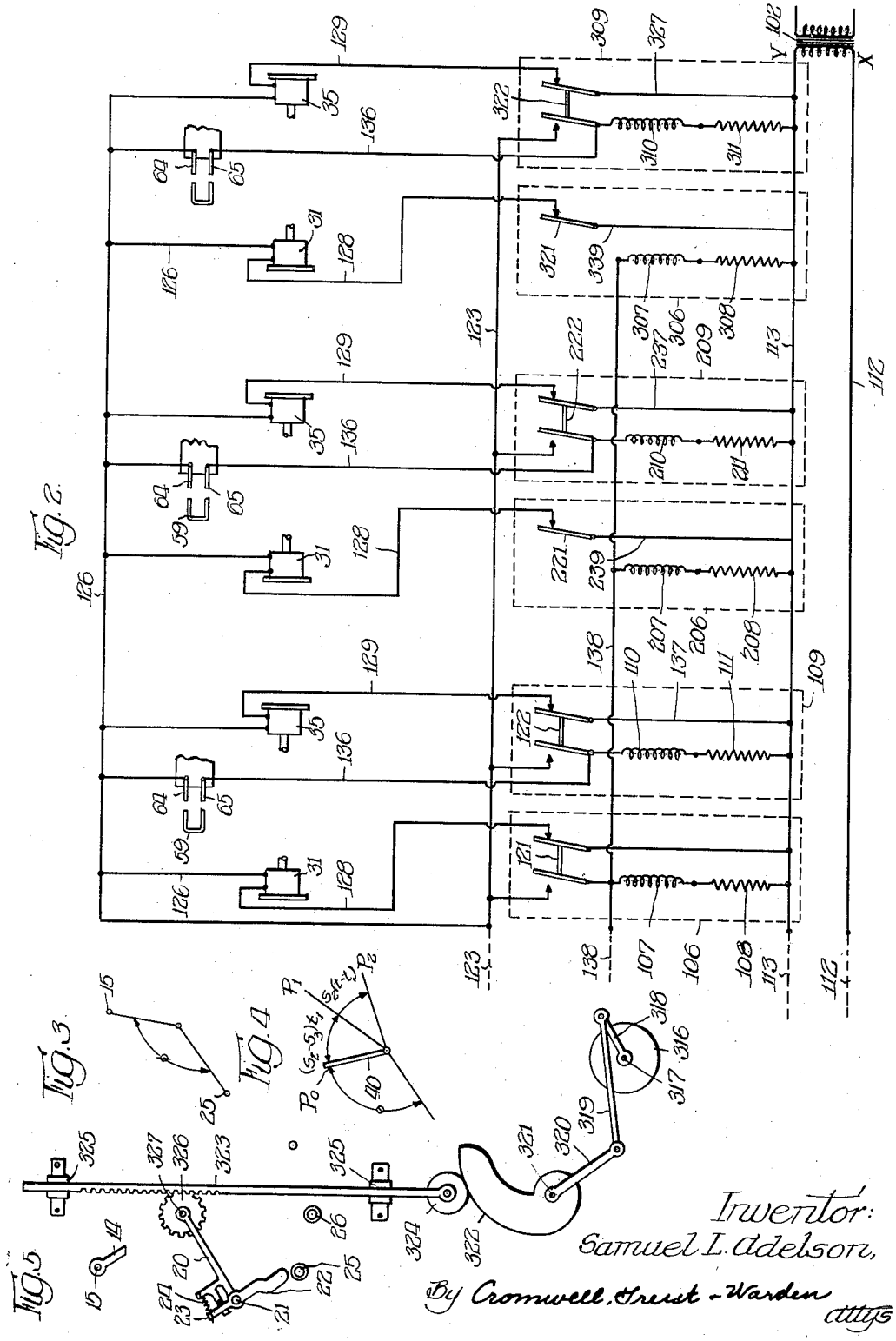
Inventor:
Samuel L. Adelson,
By Cromwell, Greist - Warden
attys Patented Nov. 29, 1938

2,138,266

UNITED STATES PATENT OFFICE 2,138,266

FLOW METERING DEVICE

Samuel L. Adelson, Chicago, Ill., assignor, by mesne assignments, to Infilco Inc., a corporation of Delaware Application April 23, 1936, Serial No. 75,966

12 Claims. (Cl. 177—351)

The present invention relates to apparatus by which some physical responsive effect is produced in accordance with an initiating physical change, and has particular reference to an improved device by which a counter is actuated, or an indicator is positioned, or some other mechanism is operated in response to and in accordance with a fluid flow. The invention will be found to have particular utility in water supply systems in which a flow of water to be treated is supplied with an amount of chemical dependent upon the rate of flow, or the volume of the flow is measured or the rate of flow is indicated by a suitable meter device.

A principal object of the invention is the provision of apparatus of the type described which will be responsive to a primary physical change and will accurately produce some secondary operation in accordance with such physical change.

An additional object is the provision of an improved device for translating an initial physical change in one locality into a secondary physical change in another locality which may or may not be remote from the locality of the initial physical change.

A further object is to provide an initiating or actuating mechanism operated by a source of changeable physical energy and a responsive mechanism adapted to be operated in accordance with said initiating mechanism.

Still another object is to provide apparatus of the type described by which an effect produced at a remote point is not limited by the energy of the particular change occurring at a primary point.

A further object is the provision of apparatus operable to measure a changing or changeable function such as a flow of liquid, to indicate or record such a function and to control at a remote point some physical action relative to said changing function.

These and other objects will be evident upon consideration of the following description of a preferred embodiment of the invention and by reference to the accompanying drawings, in which Fig. 1 is a view partly in perspective of apparatus constructed in accordance with the invention;

Fig. 2 is a view of part of a wiring system for an alternative form of the invention;

Fig. 3 is a view showing one angle of operation in the initiating mechanism;

Fig. 4 is a view of another angle of the operation of the mechanism; and

Fig. 5 shows a further modification of the device of Fig. 1.

Figure 1:
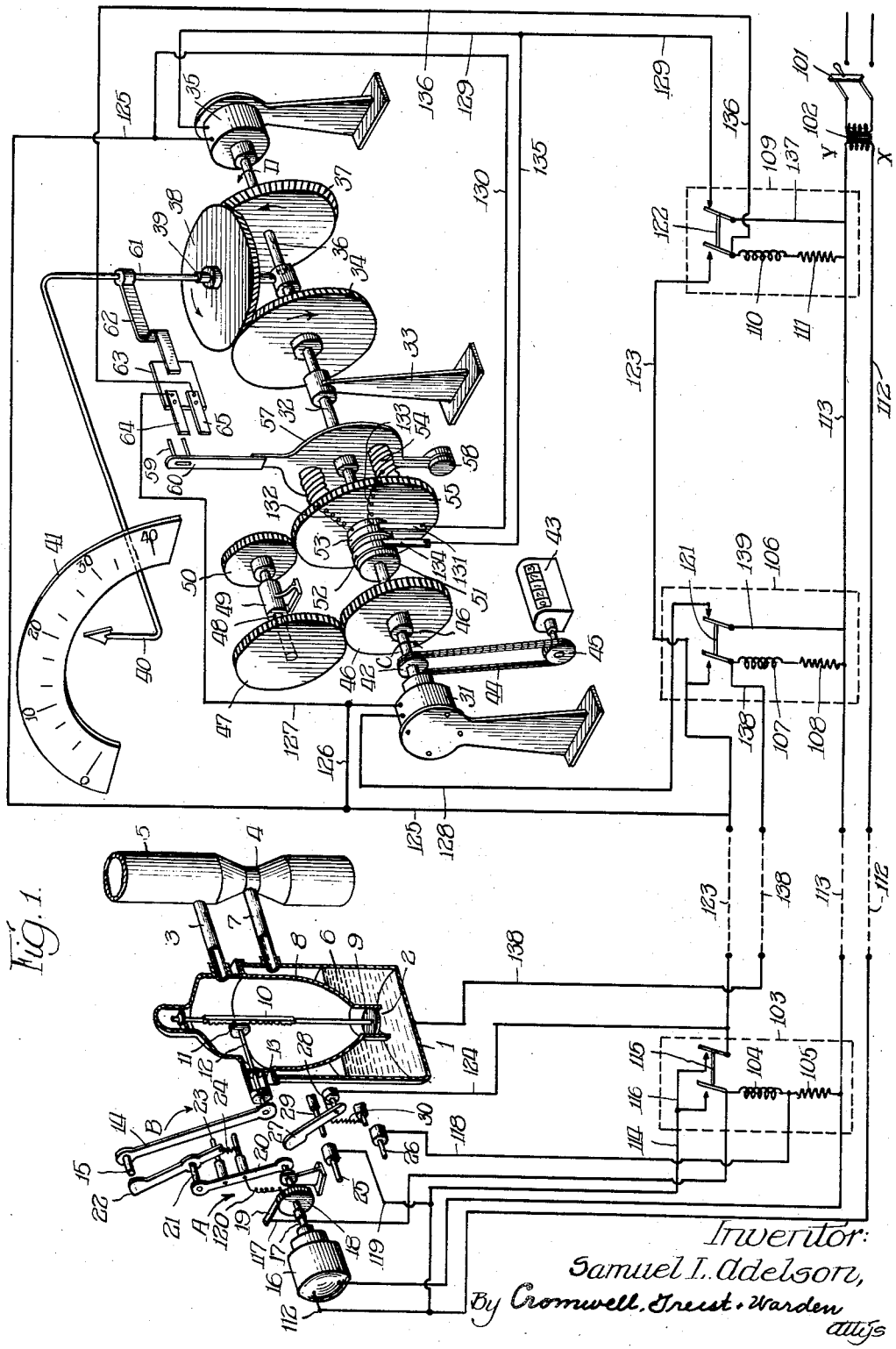

For purpose of explanation and illustration, the invention is shown in the drawings as applicable to a liquid flow system which is susceptible of change in rate of flow. In Fig. 1 a mercury manometer indicated at 1 is provided with a chamber 2 of uniform cross-sectional area over its working range and connected through line 3 with the upstream or high pressure section of a Venturi tube 4 or other differential pressure-creating device of a fluid line 5.

Surrounding chamber 2 and concentric therewith is a second chamber 6 which is connected to the low pressure or down stream side of the differential pressure-creating device by means of pipe 7. The cross-sectional area of chamber 6 varies in accordance with the shape of the insert 8 which extends upwardly in the manometer from the walls of chamber 2. More particularly, the outer walls of the manometer are substantially cylindrical, while the hollow insert 8 becomes larger toward its top, whereby to form the chamber 6 with varying cross-sectional areas such that the distance of the mercury level in the chamber 2 from a datum will be proportional to the first power of the rate of flow through the system with which the manometer is connected.

A float 9 rides on the top of the mercury in chamber 2 and carries an upwardly extending rack bar 10, the upper end of the latter moving in a conventional guide. Rack 10 meshes with and actuates a gear 11 attached to one end of the horizontal shaft 12. The opposite end of shaft 12 passes through a stuffing box 13 and is connected on the outside of the manometer to an arm 14. The free end of arm 14 carries a contact pin 15.

Manometers of this type are of particular utility where the flow to be measured is under appreciable pressures. Under other conditions it will be understood that other or additional mechanism performing substantially the same function may be employed.

Adjacent the manometer is mounted a synchronous motor 16 having a shaft 17 extending substantially parallel to shaft 12. On an intermediate part of shaft 17 and insulated therefrom is a collector ring 18 which is contacted by a brush 19. The outer end of shaft 17 carries an arm 20 which is insulated therefrom. Arm 20 carries a pin 21 on its free end and to this pin is mounted the rotatable contactor 22. Normally, contactor 22 is held very lightly against a stop 23 on arm 20 by a spring 24.

A fixed contact pin 25 is positioned adjacent the manometer and in line with the position contact 15 theoretically would assume when the rate of flow in line 5 is zero.

An additional fixed contact pin is positioned a suitable distance ahead of contact pin 25, as will be described more particularly hereinafter.

When a manometer of the type indicated is employed to indicate the rate of flow through line 5, the position of arm 14 is not at the theoretical zero position when there is no flow. On the contrary, its position will be spaced from the theoretical zero position a distance which will depend upon the constants chosen in determining the shape of the outer chamber 6. The position actually assumed by the arm 14 when there is no flow through conduit 5 is termed the "practical zero."

Where an integrator is used in connection with the device it becomes necessary to prevent its functioning when or after this practical zero is reached by the contact 15, otherwise the counter will register at a rate corresponding to the angular distance between the theoretical and practical zeros, even though there is no flow through the fluid conduit. To prevent such errors in integration of flow, there is provided a contactor 27 which is pivoted about pin 28 and held against stop 29 by spring 30. When arm 14 is in the position it assumes at no flow conditions, contact 15 touches contact 27. The shaft 17 and hence contactor 22 move continuously in the direction shown by arrow A, and in each revolution contactor 22 contacts pins 25 and 15 and 26 successively.

The mechanism described may be classed as the initiating or actuating part of my improved apparatus, and is combined with responsive mechanism which may be remotely located therefrom.

The responsive mechanism includes a synchronous motor 31 of the same speed as motor 16. Motor 31 has a shaft 32 provided with a spaced bearing support 33 and a beveled gear 34 rigidly mounted on its end, the shaft being rotated as indicated by the arrow C.

An additional synchronous motor 35 of the same speed as motors 16 and 31 is positioned with its shaft 36 in line with shaft 32. Beveled gear 37 mounted on the end of shaft 36 is rotated in an opposite direction from gear 34, as indicated by arrow D.

Gears 34 and 37 mesh and form a differential mechanism with idler gear 38, the latter rotating about shaft 39. Shaft 39 has an extension arm 40 constituting a pointer which registers with a suitably calibrated dial 41 for indicating rates of flow. In the differential, if gears 34 and 37 rotate at the same speed for the same length of time, idler gear 38, shaft 39, and pointer 40 will have no angular movement. Rotation of the gears at a different speed or for a different length of time will cause a corresponding angular movement of gear 38, shaft 39 and pointer 40 about the axis of shafts 32 and 36.

Shaft 32 also carries a sprocket 42 which drives a counter 43 by means of chain 44 and sprocket 45.

Gear 46 mounted on shaft 32 meshes with a gear 47 of equal diameter, the latter gear being mounted on shaft 48. The shaft 48 extends through bearing 49 and carries a gear 50 on its opposite end.

A sleeve 51 rotatably mounted on shaft 32 is provided with collector rings 52 and 53. These rings are insulated from the sleeve and from each other. Longitudinal movement of the sleeve may be prevented by a set collar (not shown). The sleeve 51 likewise carries an electromagnet 54 and a gear 55. Gear 55 meshes with and is twice the diameter of gear 50.

An armature 57 is mounted to rotate very freely on shaft 32 and is provided with a counterweight 58 suspended from the lower end thereof. The upper end of the armature carries a U-shaped electrical conductor 59 insulated from the armature by a non-conducting holder 60. The counterweight on the armature causes it to assume a vertical position wherein the conductor 59 is held in a position which corresponds to the theoretical zero position of contact 15.

Since gears 46 and 47 are of the same diameter and gears 50 and 55 are of a one-to-two ratio, the electromagnet 54 will rotate at one-half the speed of shaft 32.

Shaft 39 also carries an arm 61 which supports a bracket 62 and an insulating block 63, the latter carrying spaced contacts 64 and 65 which are adapted to be contacted by the arms of the U-shaped conductor 59.

The apparatus described is energized by suitable electrical circuits. Relay 103 is provided with a holding coil 104 and a resistor 105. In addition to relay 103 the electrical system includes a two-pole relay 106 having a holding coil 107 and a resistor 108, and a similar relay 109 provided with a holding coil 110 and a resistor 111.

Lines 112 and 113 connect motor 16 with terminals x and y, respectively, of transformer 102. A branch line 114 leads from line 112 to the left make and break contact of a double switch 115. Line 116 connects line 114 to the right make and break contact of the switch. Line 117 connects the brush 19 with the left pole of switch 115, this pole also being in connection with one terminal of the holding coil 104 of relay 103. The other terminal of coil 104 is connected by means of line 118 to contact 26. Line 118 also is connected to one terminal of resistor coil 105 of relay 103, and the other terminal of coil 105 connects with line 113. Contact 25 is connected to line 114 by line 119. Arm 20 is in electrical contact with collector ring 18 by means of line 120.

The right pole of switch 115 is connected to the left contacts of switches 121 and 122 by means of line 123. Contact 27 is connected to line 123 by line 124. Line 123 also is connected to motor 35 by line 125. Line 125 is connected with motor 31 by line 126. A branch line 127 from line 126 leads to the contact 64. The other terminal of motor 31 is connected to the right contact of switch 121 by line 128. Likewise, the other terminal of motor 35 is connected with the right contact of switch 122 by line 129.

Line 125 has a branch line 130 leading to a brush 131 which contacts the collector ring 53, the latter being connected to electromagnet 54 by line 132. Collector ring 52 has a brush 134 which is connected to line 129 by line 135 and is connected to the electromagnet 54 by line 133.

The left contact of switch 122 connects with the holding coil 110 of relay 109 and with line 136 leading to contact 65. The terminals of resistor 111 form a connection between coil 110 and line 113. The right pole of switch 122 is connected with line 113 by line 137.

The left pole of switch 121 is connected to line 113 by coil 107 and resistor 108. Also, this pole is connected to the outside wall of manometer 1 by means of line 138. The right pole of switch 121 is connected to line 113 by line 139.

When the switch 101 is open, no current is received by the system and no power is applied to any of the elements thereof which are actuated electrically. Also, the relative positions of contact 22, contact 15, U-shaped conductor 59, contacts 64 and 65, and pointer 40 may be as shown in Fig. 1.

If switch 101 is closed, the circuit from terminal $x$ of transformer 102, line 112, motor 16, and line 113 to terminal $y$ of the transformer will be energized, thereby starting motor 16. Contactor 22 starts rotation with motor 16 and in a short time will form a connection with contact 15, but without then changing any condition existing just prior to their contact. When contact 22 touches pin 25 a circuit is established from terminal $x$ of the transformer through line 112, line 114, line 119, contact pin 25, contact 22, line 120, ring 18, brush 19, line 117, relay coil 104, resistor 105, and line 113 to terminal $y$ of the transformer. This causes switch 115 to close and at the same time establishes a holding circuit for coil 104 which remains energized and holds the switch 115 closed even though the connection between contact 22 and pin 25 is broken. Closing of switch 115 completes the circuit from terminal $x$ through line 112, line 114, line 116, the right hand pole of switch 115, line 123, line 125, line 126, motor 31, line 128, the right hand pole of switch 121, line 139, and line 113 back to terminal $y$ of the transformer, thereby starting motor 31. Motor 35 is started at the same time by the circuit through line 125, motor 35, line 129, the right hand pole of relay switch 122, line 137, and line 113 back to the transformer. From this it will be seen that motors 31 and 35 will start simultaneously the instant contact 22 touches contact 25, the latter being located at the theoretical zero.

Electromagnet 54 also will be energized while motor 35 is rotating, since it is connected in parallel with motor 35 by line 130, brush 131, collector ring 53, line 133, line 132, ring 52, brush 134, line 135, and line 129.

As the motors 34 and 35 rotate at the same speed and in opposite directions there will be no movement of shaft 39 about the shaft 32, and the pointer 40 will not move. Also, since electromagnet 54 now is energized it will attract its armature 57, rotate the latter about shaft 32 at one-half the speed of shaft 32, and the U-shaped conductor 59 will approach the contacts 64 and 65.

When contactor 22 reaches and touches contact 15, the coil 107 of relay 106 will be energized, breaking the circuit at the right hand pole of switch 121 and causing motor 31 to stop. The left hand pole of switch 121 will now form a by-pass around contactor 22 and contact 15, so that even if the circuit between 22 and 15 is broken the coil 107 will remain energized, holding open the circuit of motor 31 and holding closed the circuit of coil 107. The closed electrical circuit established to energize coil 107 and hence stop motor 31 when contactor 22 and contact 15 meet is from terminal $x$ of transformer 102 through line 112, line 114, the left pole of switch 115 (now closed), line 117, brush 19, conductor 120, contactor 22, contact 15, the casing of manometer 1 (to which contactor 15 is grounded), conductor 138, coil 107, resistor 108 and conductor 113 to terminal $y$ of transformer 102.

If the angular position of contact 15 from the theoretical zero position is just twice the angular position of pointer 40 from its theoretical zero position, then U-shaped conductor 59 will touch contacts 64 and 65 at the same instant that contactor 22 touches contact 15. In that event motor 35 will stop simultaneously with motor 31, the pointer 40 will remain in its position, electromagnet 54 will be de-energized, and member 57 carrying the U-shaped conductor 59 will swing back to its normal vertical position. The circuit established to accomplish this is from terminal $x$ of transformer 102 through line 112, line 114, line 116, the right hand pole of switch 115 (which is still closed), line 123, line 125, line 126, line 127, contact 64, U-shaped conductor 59, contact 65, line 136, coil 110 of relay 109, resistor 111, and line 113 to terminal $y$ of transformer 102. This will energize coil 110 and open the circuit of motor 35. At the same time a by-pass will be formed by the closed left hand pole of switch 122 around contacts 64 and 65 to keep coil 110 energized even though the circuit is broken between contacts 64 and 65 when the member 57 returns to its vertical position.

While motor 31 is rotating it causes the integrator 43 to function, and as the time interval during which motor 31 rotates is proportional to the angular position of the contactor 15 from its theoretical zero position and hence in proportion to the rate of flow, the increase in the reading of the integrator 43 will be proportional to the volume of fluid passed through the system during the cycle.

When the contactor 22 next touches contact pin 26, the switch 115 of relay 103 will open, and, as coil 107 of relay 106 and coil 110 of relay 109 have been contacted to the source of current through the right hand pole of switch 115, the coils 107 and 110 will be de-energized, thereby returning switches 121 and 122 to the position shown in Fig. 1. This condition represents the end of a cycle. The period of rotation of contactor 22 is elective and is determined with reference to the probable frequency of changes of flow and their amount. Ordinarily it does not exceed one minute.

The circuit established to bring about this condition when contactor 22 touches contact 26 short circuits coil 104 of relay 103, whereby coil 104 becomes de-energized and opens switch 115. This circuit is from the upper terminal of coil 104, line 117, brush 19, ring 18, conductor 120, contactor 22, contact 26, line 118 to the lower terminal of coil 104. When the switch 115 opens, coil 104 remains de-energized, even though contactor 22 and contact 26 were to continue touching, since the upper terminal of coil 104 is disconnected from the source of current.

When contactor 22 again touches pin 25 a new cycle begins, and subsequent events will be as described above, provided no change occurs in the position of contact pin 15, i. e., in the rate of flow, before contactor 22 reaches it.

Where there has been a decrease in the rate of fluid flow prior to the beginning of a new cycle, the contactor 15 will be closer to its theoretical zero position. When contactor 22 touches contact 25, motors 31 and 35 will start as before, counter 43 will begin integrating, electromagnet 54 will be energized and U-shaped conductor 59 will approach contacts 64 and 65, but there will as yet be no movement of pointer 40.

When contactor 22 touches contact 15, motor 31 will stop, as will integrator 43 and the movement of U-shaped conductor 59 toward contacts 64 and 65. The conductor 59 will remain in its then position since electromagnet 54 although not being rotated is still energized, it being remembered that electromagnet 54 is in parallel with motor 35. Because motor 31 has stopped and motor 35 continues to rotate there will be a movement of the pointer 40 toward its zero position. This movement will move contacts 64 and 65 toward U-shaped conductor 59 and when contact is made motor 35 will stop, as will movement of pointer 40. Electromagnet 54 will be de-energized and conductor 59 will return to its original position with the return of the member 57. The new position of pointer 40 will now correspond to the new position of contact 15. This is evident when it is considered that U-shaped conductor 59 stopped in a position corresponding to the new position of contact 15 while contacts 64 and 65, and with them pointer 40, moved back to the position of 59, whereupon motor 35 stopped.

Should there have been an increase in the flow rate prior to the beginning of a new cycle, the contactor 15 will have moved further away from the theoretical zero position. When contactor 22 touches contact 25, motors 31 and 35 will start, counter 43 will begin integrating, electromagnet 54 will become energized and conductor 59 will approach contacts 64 and 65. Pointer 40, however, will remain stationary. Since the contact 15 is now further from its zero position than the corresponding distance of contacts 64 and 65 and pointer 40 from their zero positions, the U-shaped conductor 59 will reach contacts 64 and 65 before contactor 22 will reach contact 15. When conductor 59 touches contacts 64 and 65 motor 35 will stop, electromagnet 54 will be de-energized and conductor 59 will move back to its zero position. Motor 31, however, is still rotating and will move pointer 40 away from its zero position until contactor 22 touches contact 15, whereupon motor 31 will stop, as will the integrator 43. Pointer 40 will now be in a new position corresponding to the new position of contact 15. The angle moved through by pointer 40 will correspond to the angle between the previous and new position of contact 15, because motor 35 stopped when conductor 59 had traveled through an angle corresponding to the previous position of 15 while from then on motor 31 alone operated, carrying pointer 40 forward through the angle between the previous and the new positions of 15.

The apparatus as shown constitutes a self-compensating device to correct for any slight lack of synchronism which may exist among motors 16, 31 and 35 and which otherwise would result in a progressive movement of pointer 40 or other error. Referring to Figs. 3 and 4, let $S_1$ be speed of motor 16 in degrees per second
$S_2$ be speed of motor 31 in degrees per second
$S_3$ be speed of motor 35 in degrees per second
$t$ = time elapsed between contact of 22 with 25 and 22 with 15
$t_1$ = time elapsed between contact of 22 with 25 and 59 with 63 and 64

In Fig. 3 contact 15 is shown displaced $\phi°$ from the practical zero and in Fig. 4 arm 40 displaced $\theta°$ from its practical zero position, this position being indicated by $P_0$.

In a time $t_1$, arm 40 will move from $P_0$ to $P_1$ or (1) Position $P_2 = \theta + (S_2 - S_3)t_1 + S_2(t - t_1)$
(2) $= \theta + S_2 t_1 - S_3 t_1 + S_2 t - S_2 t_1$
$= \theta + S_2 t - S_3 t_1$ But $\dfrac{\theta + (S_2 - S_3)t_1}{S_2} =$ $\dfrac{(S_2 - S_3)}{(S_2 - S_3)} t_1$ or $\theta + S_2 t_1 - S_3 t_1 = S_2 t_1$ and (3) $S_3 t_1 = \theta$ Substituting (3) in (2) the position $P_2$ will be (4) $P_2 = S_3 t_1 + S_2 t - S_3 t_1 = S_2 t$ which is independent of the speed of motors 16 and 35 and the time $t_1$. It is understood that the positioning of arm 40 must be accomplished before contactor 22 has completed its cycle. That is, a rotation of contact 22 takes longer than the time of energization of motor 31 and 35 and longer than the time for the maximum movement of arm 40.

When there is no flow through the fluid conducting system, the contactor 15 will be at the practical zero, this position being somewhat displaced from the theoretical zero position. Therefore, means must be provided whereby the motor 31 will not start when contactor 22 touches contact 15 while the latter is at the practical zero, in order to prevent functioning of the integrator. As contact 15 reaches the practical zero position it touches contactor 27 and remains in contact so long as contact 15 is at this position. When contactor 22 now touches contact 25 it closes switch 115 as previously described. With contact 15 touching contact 27 this now establishes a closed circuit to prevent motor 31 from starting. The circuit is from terminal $x$ of transformer 102 through line 112, line 114, line 116, the right hand pole of switch 115, line 123, line 124, contactor 27, contact 15, casing 1, line 138, coil 107, resistor 108, and line 113 back to terminal $y$ of transformer 102. Current passing through this circuit energizes coil 107, breaking the circuit of motor 31 and preventing it from starting. Motor 35 will not start since U-shaped conductor 59 touches contacts 64 and 65, which opens the circuit of motor 35 as described heretofore. When contactor 22 now touches contact pin 26, the coils 104, 107 and 110 of relays 103, 106, and 109, respectively, will be de-energized as previously described. The apparatus therefore will be set for a new cycle.

In Fig. 2 a wiring diagram is shown whereby a plurality of responsive members may be made to assume positions corresponding to that assumed by the contact 15. As this figure is essentially a diagram, the disclosure is limited to the elements necessary to a proper understanding of the device. In actual practice, the wiring may be simplified somewhat. For example, line 126 may be dispensed with and all connections shown made to this line may be connected directly with line 123. Fig. 2 shows three different responsive mechanisms actuated by one initiating mechanism, each of the responsive mechanisms being provided with motors 31 and 35 and being substantial duplicates of the responsive mechanism shown in Fig. 1. These responsive mechanisms may be made to perform different functions. For example, one of the stations may be employed as a permanent recording station, another may be used to indicate changes in flow, and another may be employed to actuate a chemical feeding device.

The wiring diagram for the first responsive mechanism unit is indicated by the numerals applied to the wiring diagram of the responsive mechanism in Fig. 1. The second and third responsive mechanism units are wired in parallel with the first unit and the wiring diagram for these units corresponds with the diagram for the first unit. That is, line 126 leads to the motors 31 and 35 of the second and third units and to the contacts 64 for these units.

Motor 31 for the second unit is connected by a line 128 to one terminal of the switch 221 of relay 206. Coil 207 of relay 206 has one end connected to line 138 and the other end to resistance coil 208, the latter being connected to line 113. Switch 221 is connected to line 113 by line 239. Contact 65 of the second responsive unit is connected by a line 136 to one pole of the switch 222 of relay 209. Holding coil 210 of relay 209 extends between the contact which line 136 makes with switch 222 and resistance coil 211, the latter being connected to line 113. The other permanent contact of double switch 222 is joined to line 113 by line 237. The make and break contacts of double switch 222 are positioned to alternately contact an extension of line 123 and line 129 leading to motor 35 of the second responsive mechanism unit.

Similarly, the motors 31 and 35 and contact 64 of the third responsive mechanism unit each have one connection leading to line 126. The other connection to motor 31 of the third unit leads through line 128 to the make and break contact of switch 321 of relay 306. The permanent contact of switch 321 is connected to line 113 by line 339. Coil 307 is connected to line 138 and to resistance coil 308 which joins line 113. Contact 65 of the third responsive unit is connected to one permanent contact of double switch 322 of relay 309 by a line 136. Holding coil 310 is connected between this contact and resistance coil 311, the latter also being connected to line 113. The other permanent contact of double switch 322 is connected to line 113 by line 327. The make and break contacts of switch 322 alternately contact an extension of line 123 and line 129 leading to motor 35 of the third unit.

As described with respect to Fig. 1, when contactor 22 of the initiating device touches contact 25, the switch 115 closes. In Fig. 2, this places lines 123, 125 and 126 in circuit with terminal X of transformer 102, and completes the circuits through the motors 31 and 35 of the first, second and third responsive units.

When contactor 22 touches contact 15, coil 107 of relay 106 is energized, thereby opening the circuit through motor 31 of the first unit, as previously described. Since the upper terminals of coils 207 and 307 likewise are connected to line 138, these coils likewise are energized and switches 221 and 321 are opened in the same manner as described in connection with switch 121. Therefore, the motors 31 of the three responsive units start and stop simultaneously.

The stopping of the motors 35 of the three responsive units are governed individually. More particularly, when the U-shaped contactors 59 of each of the responsive units connect with their respective contacts 64 and 65, the corresponding motors 35 will be stopped in the same manner as described in connection with Fig. 1. This action is desirable in order to prevent progressive movement of the members 40 of the various units in the event any of the motors are not in proper synchronism.

In this manner the operation of the three responsive units is controlled by the single initiating device.

The invention has been described with reference to a manometer of the type in which the mercury level upon which the float rides varies in its position from the theoretical zero level in accordance with the first power of the flow rate. Manometers of the type in which each leg is of uniform cross-section also may be employed. In the latter case, the movement of the mercury level upon which the float rides will vary from its zero position in accordance with the second power of the flow, and the position of contact 15 with respect to contact 25 will vary in accordance with the same power.

Other variables may be employed to position contact 15. For instance, the positioning may be effected by the variation in the level of a liquid passing over a weir. Motivation of the initiating device is not restricted to the flow of a fluid. Changes in temperature, pressure or liquid level may be relied on to operate the initiating device, or, this mechanism may be set by hand.

The movement of the scanning member need not be rotational, and the positioning of the member 40 may be other than in direct proportion to that of arm 14. An example of a modification of this kind may be seen in Fig. 5 in which the member 40 is positioned in accordance with the first power of the flow and the movement of contact 15 is governed by a different principle. In this embodiment of the invention, a synchronous motor 316 is provided with a shaft 317 on which is mounted a crank 318. A link 319 connects this crank to a second crank 320 fixed to the shaft of a cam member 322. As shaft 317 continuously rotates, an oscillatory motion is imparted to link 319, crank 320 and cam 322. A rack stem 323 has a cam roller 324 on its lower end which rides on cam 322, thereby alternately varying and lowering the rack bar through its guide bearings 325. The rack bar meshes with and rotates a gear 326, the latter being fixed to a shaft 327. Shaft 327 carries the arm 20 having on its end the contactor 22 pivoted about pin 21. As in Fig. 1, contactor 22 normally is held against stop 23 by spring 24. The contact pin 15 shown in Fig. 5 is carried on arm 14 which is fixed to the spindle of a manometer or other flow actuated device such as shown in Fig. 1.

The contour of member 322 is so formed that the vertical movement of stem 323 from its lowest position will vary as does the angular position of contact 15 from its zero position in relation to the flow rate. It is evident then that the time which elapses between the touching of contactor 22 with contact 25 and with contact 15 will vary as the first power of the flow rate and that the members or member 40 be positioned accordingly. The electrical circuits are the same as shown in Figs. 1 and 2 except that elements 26 to 30 inclusive and line 124 of Fig. 1 are omitted, since with the means shown in Fig. 5 it is assumed that the practical and theoretical zeros coincide, as may be the case. At the beginning of a cycle, 22 contacts 25, thereby starting motors 31 and 35. When contact 22 touches contact 15, motor 31 stops. On the return movement of contactor 22 the latter again touches contacts 15 and 25 but does not effect any change, due to previous breaking of the circuits by the previous contact of contactor 22 with contacts 25 and 15. However, when contactor 22 touches contact 26 it opens switch 115, resetting all relays for the beginning of a new cycle, all as previously described in connection with Figs. 1 and 2. Immediately after contactor 22 touches contact 26 the forward movement of arm 20 again takes place and a cycle starts upon the touching of contactor 22 with contact 25. The shape of cam 322 and consequently the relation between the positioning of contact 15 and the member 40 may be as desired.

The motor 16, which operates the scanning member, ordinarily will be of small size, say such as may be used in electric clocks, and when used in a meter as in the example illustrated, the motors 31 and 35 may well be of the same size. There is no reason, however, for any such limitation as to size of any of these motors and it may be sometimes desirable, particularly with respect to motors 31 and 35, to use motors of appreciable power so as to overcome very appreciable resistance and to position parts or operate valves or other apparatus requiring application of considerable power. Because of such considerations it will be apparent that my invention may have many applications besides those referred to herein.

The various possible changes from the structure described herein for purposes of explanation which may be made without departing from the scope of the invention are intended to be included in the appended claims.

I claim:

1. In a device of the type described, an indicating mechanism positionable in accordance with some physical condition, a responsive mechanism having a differential device and two continuously operating oppositely rotating driving means operable together to produce a mean result through said differential, and means for varying the duration of movement of each of said driving means with respect to the other in accordance with the position of said initiating mechanism.

2. In a device of the type described, an initiating mechanism positionable in accordance with some physical change, a responsive mechanism including a differential device having opposed initially continuously operating driving means and a member moved in accordance with the difference in time of motion of said driving means, and means for prolonging the time of motion of one of said driving means with respect to the other of said driving means in accordance with the position of said initiating mechanism.

3. In a device of the type described, an initiating mechanism operable in accordance with some physical condition, a responsive mechanism including a differential device having separate driving means for the two sides thereof and a member moved in accordance with a difference in operation of said driving means, means cooperating with said initiating mechanism for periodically starting said driving means simultaneously and means effective within said period for stopping said driving means simultaneously when there has been no change in said physical condition.

4. In a device of the type described, an initiating mechanism responsive to a physical change and having a movable contact positioned in accordance with said change, a constant speed motor having a scanning contact mounted to its shaft and adapted to periodically establish an electric circuit upon contact with said movable contact, complementary motors energized upon completion of said circuit, a member operated by each motor, means operated by the differential action of said members, and means including said operated means for causing operation of one of said motors for a longer time than the other depending upon change of position of said movable contact.

5. In a device of the type described, an initiating mechanism responsive to a physical change, responsive mechanism including two complementary synchronous motors and a differential device driven thereby, means operated by said differential device, and means cooperating with said initiating mechanism for controlling operation of said complementary synchronous motors for unequal periods of time dependent upon said physical change.

6. In a device of the type described, comprising an initiating mechanism responsive to a physical change and having a movable contact positioned in accordance with the magnitude of such change; a responsive mechanism including opposed synchronous motors, a differential driven thereby and means operated by said differential; a constant speed motor having a scanning contact periodically touching said movable contact to establish a circuit including said synchronous motors, and means for breaking the circuit to one or the other of said synchronous motors in accordance with the degree of increase or decrease represented by said physical change.

7. In a device of the type described, comprising an initiating mechanism responsive to a physical change and having a movable contact positioned in accordance with such change and a second contact associated with said movable contact; a responsive mechanism including means connected to two motors and operable only when one of said motors is rotating at a speed in excess of the other; electric circuits connected to said motors; circuits including a starting contact for said motors and a stopping contact for one of said motors, said starting and stopping contacts being each one of the aforesaid contacts; and a scanning mechanism for consecutively touching said contacts to control the relative rotation of said motors in accordance with the position of said movable contact.

8. In a device of the type described, comprising an initiating mechanism responsive to a physical change and having a movable contact positioned in accordance with such change; a responsive mechanism including a differential device having driving gears, an idler, means operated by said idler and complementary motors for driving said gears in such a manner that said idler is moved in accordance with the difference in rotation of said motors; a second contact associated with said movable contact; a third contact carried by said idler; a scanning member movable in cycles through a path to touch said first and second contacts in each cycle; and circuit means joining said contacts, motors, scanning member and a source of power adapted and arranged in each cycle to start both motors upon contact of said scanning member with either of said movable or said second contacts, to stop the rotation of one of said motors upon contact of said member with the other of said contacts, and to stop the rotation of the other motor upon completion of a circuit through said third contact.

9. In a device of the type described comprising an initiating member having a movable member positionable according to a physical condition and, a differential mechanism having complementary driving gears and an idler therebetween moved in accordance with the difference in rotation of said gears, complementary motors for driving said gears, means for starting said motors simultaneously, and means for stopping either of said motors independently of the other, said initiating member and said stopping means including electric circuits that are opened and closed in accordance with the positions of said movable member and said idler.

10. In a device of the type described, a differential mechanism including complementary driving gears and an idler moved in accordance with the difference in rotation of said gears, means operated by said idler, complementary synchronous motors for driving said gears, periodically operating means for starting said motors simultaneously, means for stopping one of said motors upon predetermined motion of said idler, and means for stopping the other of said motors in accordance with some physical change and prior to the next operation of said periodic starting means.

11. In a device of the type described, an initiating mechanism having a first contact and a second movable contact which is positioned in accordance with some physical change, a scanning mechanism operable to cyclically move a third contact across said first and second contacts, a differential device having complementary driving gears and an idler, contact means operated by said idler, complementary motors for driving said gears, and circuits joining said contacts, motors and a source of power in such a manner that both motors will be energized simultaneously when said scanning contact touches said first contact, that one motor will be de-energized when said scanning contact touches said movable contact, and that the other motor will be de-energized through the contact means operated by said idler.

12. In a device of the type described comprising an indicating device having a member positionable according to a physical condition, a differential mechanism including complementary driving gears and an idler moved in accordance with the difference in motion of said gears, means operated by said idler, complementary motors for driving said gears, means for periodically starting said motors simultaneously, means for stopping said motors simultaneously when there has been no change in the position of said indicating member, selective means for stopping first one and then the other of said motors when there has been a change in position of said indicating member, and means for governing the interval between the stoppage of said motors in accordance with the change in position of said indicating member.

SAMUEL L. ADELSON.